US006546313B2

(12) United States Patent
Nakahira et al.

(10) Patent No.: US 6,546,313 B2
(45) Date of Patent: Apr. 8, 2003

(54) IMAGE FORMING APPARATUS

(75) Inventors: Yoshinori Nakahira, Yamatorkoriyama (JP); Hirohito Morioka, Nara (JP); Takashi Ide, Yamatokoriyama (JP); Mariko Arai, Kashihara (JP); Kazuya Masuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 52 days.

(21) Appl. No.: 09/855,740

(22) Filed: May 16, 2001

(65) Prior Publication Data

US 2001/0054793 A1 Dec. 27, 2001

(30) Foreign Application Priority Data

May 17, 2000 (JP) ....................................... 2000-144459

(51) Int. Cl.[7] .................................................. G06F 7/00
(52) U.S. Cl. ..................... 700/224; 700/223; 270/52.03
(58) Field of Search ................................ 700/224, 226, 700/223; 270/52.03

(56) References Cited

U.S. PATENT DOCUMENTS 5,161,795 A * 11/1992 Kim et al. .................. 271/288
5,308,058 A * 5/1994 Mandel et al. .............. 271/297
5,358,238 A * 10/1994 Mandel et al. .............. 271/298
5,435,544 A * 7/1995 Mandel ....................... 270/58
5,464,200 A * 11/1995 Nakazato et al. ............. 270/53
5,602,973 A * 2/1997 Nishiwaki ................... 395/113
5,603,492 A * 2/1997 Mandel et al. ........... 270/58.09
5,752,697 A * 5/1998 Mandel et al. ........... 270/58.18
5,815,764 A * 9/1998 Tomory ......................... 399/1
5,823,529 A * 10/1998 Mandel et al. .............. 271/296
5,867,393 A * 2/1999 Richardson et al. ... 364/478.11
5,970,218 A * 10/1999 Mullin et al. ............... 395/114
6,192,295 B1 * 2/2001 Gunther ....................... 700/225
6,206,360 B1 * 3/2001 Urata et al. ................. 700/213
6,324,442 B2 * 11/2001 Gunther ....................... 700/224
6,349,243 B1 * 2/2002 Takagi ........................ 700/223
6,421,581 B1 * 7/2002 Hamamoto et al. ......... 700/223

FOREIGN PATENT DOCUMENTS

JP 6-169367 A 6/1994
JP 10-29752 A 2/1998

* cited by examiner

*Primary Examiner*—Douglas Hess
(74) *Attorney, Agent, or Firm*—Nixon & Vanderhye P.C.

(57) ABSTRACT

An image forming apparatus having a plurality of discharge trays is provided, from which a user can readily obtain printed sheets he has requested. The user inputs a secret code at an operating and displaying section, which secret code the user specified at the terminal device at the time of print request (S301). When a coincidence between the inputted secret code and a secret code stored in secret code storage section is judged (S303), the target discharge tray information corresponding to the secret code is read out from a secret code storage section (memory) and displayed on the operating and displaying section (S304). Accordingly, the user can visually recognize information about a discharge tray on which the user's requested printed sheets are discharged.

5 Claims, 10 Drawing Sheets

FIG. 8

SECRET CODE STORAGE SECTION

| BASIC INFORMATION | APPENDED INFORMATION | TARGET DISCHARGE TRAY | NUMBER OF OUTPUT SHEETS |
|---|---|---|---|
| PC1-NAKA | 0930 | 1 | 5 |
| MASUPC02 | 1000 | 2 | 3 |
| MORIPRNT | 1030 | 3 | 13 |
| PC1-NAKA | 1100 | 4 | 1 |
| MASUPC02 | 1110 | 5 | 4 |
| MASUPC02 | 1130 | 2 | 2 |

FIG. 9

STORAGE CODE SECTION OF NUMBER OF SHEETS OUTPUTTED TO DISCHARGE TRAY

| DISCHARGE TRAY | NUMBER OF OUTPUT SHEETS |
|---|---|
| 1 | 5 |
| 2 | 5 |
| 3 | 13 |
| 4 | 1 |
| 5 | 4 |

IMAGE FORMING APPARATUS

BACKGROUND OF THE INVENTION

1. Field of the Invention

The present invention relates to an image forming apparatus capable of storing information including data of target discharge trays of printed sheets and secret codes in association with each other, and upon entering a corresponding secret code, notifying information of a target discharge tray on which discharged printed sheets are discharged.

2. Description of the Related Art

Networking of apparatuses using a LAN (Local Area Network) has been increasingly popular in recent years, and it has created cases where a single image forming apparatus such as a printer or a copying machine is linked to a network, making it possible to share the image forming apparatus among a plurality of terminal apparatuses. In cases where the image forming apparatus shared over the network has only one discharge tray, it is impossible to automatically sort out a plurality of print jobs to print or to print by user, which forces the users to sort out the printed documents manually by themselves. Hence, an image processing apparatus is provided with a sorter function that sorts out to discharge printed sheets to a plurality of discharge trays, so that printed sheets are automatically sorted out, allowing users to readily obtain their printed sheets of their requests.

An image forming apparatus using the sorter is disclosed in, for example, Japanese Unexamined Patent Publications JP-A 10-29752 (1998) and JP-A 6-169367 (1994).

JP-A 10-29752 discloses an image forming apparatus that keeps on discharging printed sheets to a same discharge tray, once a user transmitted image data, so long as the user further transmits succeeding print requests before removing the printed sheets of his previous requests from the discharge tray.

Also, JP-A 6-169367 discloses an image forming apparatus that discharges printed sheets to a particular discharge tray by means of a sorter, and displays on the monitor a list including the selected discharge tray and request sender information in association with each other, so that one can readily confirm the state of the sorted printed sheets.

However, the image forming apparatus disclosed in JP-A 10-29752 is not provided with means to notify where the printed sheets are discharged, and therefore, the user has to find out the discharge tray to which the printed sheets of his request were discharged. Hence, in cases where an apparatus is provided with a number of discharge trays or where a number of print jobs are processed, it is difficult for users to find target printed sheets of their requests.

Also, the image processing apparatus disclosed in JP-A 6-169367 displays both the request sender information and the discharge tray holding the printed sheets on the monitor. However, because the information is displayed in the form of a list, anyone can know who requested the printed sheets. This raises a problem that anyone can readily know the contents of the printed sheets. In addition, because more than one item of information is displayed, there is a problem that one may misunderstand the information and pick up printed sheets for someone else.

An image forming apparatus of the invention receives a secret code and print data upon receipt of a print request from a terminal apparatus, and stores information including data of a target discharge tray for printed sheets sorted out by a sorter and a secret code in association with each other.

Thus, when the user enters the secrete code using input means, notifying means notifies the user of the target discharge tray information corresponding to the secret code, thereby making it easier for the user to pick up the printed sheets sorted out by the sorter. In addition, because the target discharge tray information is notified upon entering the secret code, no one can know who requested the discharged printed sheets. Further, because only the information of target discharge tray regarding the user's printed sheets is available to the user as necessary, it never happens that he picks up someone else's printed sheets by mistake.

SUMMARY OF THE INVENTION

Hence the invention provides an image forming apparatus connected to a plurality of terminal apparatuses via a network, comprising:

- receiving means for receiving print data and a secret code specific to the print data as a print job from any of the terminal apparatuses via the network;
- sorter means having a plurality of discharge trays to which a print sheet corresponding to the print job received by the receiving means is discharged;
- controlling means for processing the print job received by the receiving means to sort out the printed sheet corresponding to the print job and discharge onto a particular discharge tray of the sorter means;
- secret code storing means for storing information of the particular discharge tray to which the printed sheet corresponding to the print job was discharged, as target discharge tray information in association with the secret code specific to the print data;
- input means for inputting the secret code; and
- notifying means for checking a coincidence between the secret code inputted by the input means and the secret code stored in the secret code storing means, and notifying a user of the target discharge tray information corresponding to the secret code stored in the secret code storing means which coincides with the code inputted.

The image forming apparatus is shared by a plurality of terminal apparatuses via a network, receives print data and a secret code specific to the print data as a print job from any of the terminal apparatuses by the receiving means, and processes the print job to output printed sheets. When sheets are printed, controlling means controls sorter means, and selects a particular discharge tray among the discharge trays and discharges the printed sheets to the selected discharge tray. Then, the controlling means stores data of the discharge tray to which the printed sheets were discharged and the corresponding secret code in secret storing means. The secret code is to be used to obtain information of a target discharge tray by a user.

The image forming apparatus comprises the input means for inputting a command from the user, and the notifying means for notifying the user of information. Thus, when the user enters the secret code using the input means in order to pick up printed sheets, the secret code entered is compared with the secret code stored in the secret code storing means to check whether they coincide with each other, so that the target discharge tray information corresponding to the secret code entered is passed onto the notifying means.

According to the invention the image forming apparatus receives print data and a secret code specific to the print data upon receipt of a print request from a terminal apparatus, and stores the target discharge tray for the printed sheets sorted out by a sorter and the secret code in association with each other. Thus, when the user enters the secret code using the input means, the notifying means notifies the user of the information of target discharge tray corresponding to the secret code. Consequently, with the image forming apparatus, the user can readily know which discharge tray received the printed sheets of his request. Also, because the target discharge tray information cannot be notified unless the secret code entered by the printer user coincides with the one stored in the secret code storing means, the secret code can be used as a password. Thus, one can never know who requested which printed sheets. Further, because only the discharge trays corresponding to the secret code as entered are subject to display, it never happens that the user picks up someone else's printed sheets by mistake.

In the invention it is preferable that the secret code is composed of basic information for identifying one of the terminal apparatuses and the user who has requested printing, and appended information.

The secret code is composed of the basic information to identify the terminal apparatus or the user who requested the printing and appended information to identify each of the print jobs received from the user having the same basic information.

According to the invention, since the secret code is composed of the basic information for identifying the terminal apparatus or the user who requested the printing job, and appended information for identifying each of the print jobs requested by the user having the same basic information, even when one user sends a plurality of print jobs, it is possible to deal with the information of target discharge trays corresponding to the respective print requests. Also, because the user is allowed to use universal basic information and make a difference only by the appended information, it is easy for the user to create a secret code. In addition, when the user picks up the printed sheets of his request, he can find all of the printed sheets having the same basic information at once by merely entering the basic information. Thus, it is not necessary for the user to repeatedly enter secret codes when he picks up printed sheets after sending a plurality of job requests.

In the invention it is preferable that upon notification of the target discharge tray information by the notifying means, the sorter means is controlled so that a space between the target discharge tray and a discharge tray placed directly above is enlarged.

The sorter means of the image forming apparatus is controlled by the controlling means so as to create a larger space between the target discharge tray holding the printed sheets and the discharge tray right above upon receipt of the information of target discharge tray, thereby making it easier for the user to pick up the printed sheets.

According to the invention, upon receipt of the target discharge tray information from the notifying means, the sorter means is controlled by the controlling means so as to create a larger space between the discharge tray holding the printed sheets the user is to pick up and the discharge tray right above. Hence, not only can the user readily recognize the discharge target of the printed sheets, but also easily pick up the printed sheets from the target discharge tray.

In the invention it is preferable that the image forming apparatus further comprises:

detection means for detecting whether a printed sheet is present on the respective discharge trays or not; and discharged sheets number storing means for storing a number of printed sheets discharged to each of the discharge trays, and the sorter means selects a discharge tray to which no printed sheet is discharged, in response to an output from the detection means, and in the case where a printed sheet is present on all of the discharge trays, in response to an output of the discharged sheets number storing means, the sorter means selects a discharge tray on which a least number of printed sheets are present, from among the discharge trays.

The image forming apparatus includes the detection means for detecting whether a printed sheet is present on a discharge tray or not, and when discharging a printed sheet, the sorter means selects a discharge tray on which no printed sheet is present, in response to an output from the detection means. Additionally the image forming apparatus comprises the discharged sheets number storing means for storing a number of printed sheets discharged to each of the discharge trays, and in cases where no empty discharge tray is found, the image forming apparatus, selects, in response to an output from the discharged sheets number storing means, a discharge tray having the least number of printed sheets thereon from among the discharge trays to discharge the printed sheet.

Thus, the workload of the user to go through all sets of printed sheets, in order to find the printed sheets of his request, thereby making it easier for the user to reach the printed sheets of his request.

In the invention it is preferable that the image forming apparatus further comprises:

detection means for detecting whether a printed sheet is present on the respective discharge trays or not, and in cases where the detection means detects that printed sheets present on an arbitrary discharge tray are completely removed therefrom, the secret code storing means deletes information corresponding to the discharge tray from which the printed sheets are removed, and the discharged sheets number storing means updates a value stored therein to zero, which value represents that the discharge tray is empty.

The image forming apparatus includes the detection means for detecting whether a printed sheet is present on each of the discharge trays. In cases where the detection means detects that the printed sheets are removed completely from any of the discharge trays, the secret code storing means is preset so as to delete the secret code and related information of the discharge tray from which the printed sheets are removed completely, while the discharged sheets number storing means is preset so as to update the value stored therein to zero, the value representing the number of discharged sheets to the discharge tray from which the printed sheets are removed completely.

According to the invention, the image forming apparatus includes the secret code storing means for storing the target discharge tray of the printed sheets and the secret code in association with each other, and the discharged sheets number storing means for storing the number of the printed sheets discharged to each discharge tray. However, in cases where the user picks up the printed sheets without entering the secret code, there arise problems that obsolete information remains in the secret code storing means, and that the discharged sheets number storing means shows incorrect values thereafter. In case of such a situation, which is when all of the printed sheets on any of the discharge trays are removed to empty, the secret code storing means is preset so as to delete the secret code and related information accumulated for the discharge tray from which the printed sheets are removed to empty. The discharged sheets number storing means is preset so as to update the value stored therein to zero, the value representing the number of sheets present on the discharge tray from which the printed sheets are removed to empty. Consequently, it is possible to erase obsolete information from the secret code storing means, and thereby improving the memory utilization and correcting the value in the discharged sheets number storing means to an updated value.

BRIEF DESCRIPTION OF THE DRAWINGS

Other and further objects, features, and advantages of the invention will be more explicit from the following detailed description taken with reference to the drawings wherein:

FIG. 8 is an explanatory view showing an arrangement of a secret code storage section (memory) shown in FIG. 2;

FIG. 9 is an explanatory view showing an arrangement of a discharge tray output sheet number storage section (memory) shown in FIG. 2;

DETAILED DESCRIPTION OF THE PREFERRED EMBODIMENTS

Figure 1:
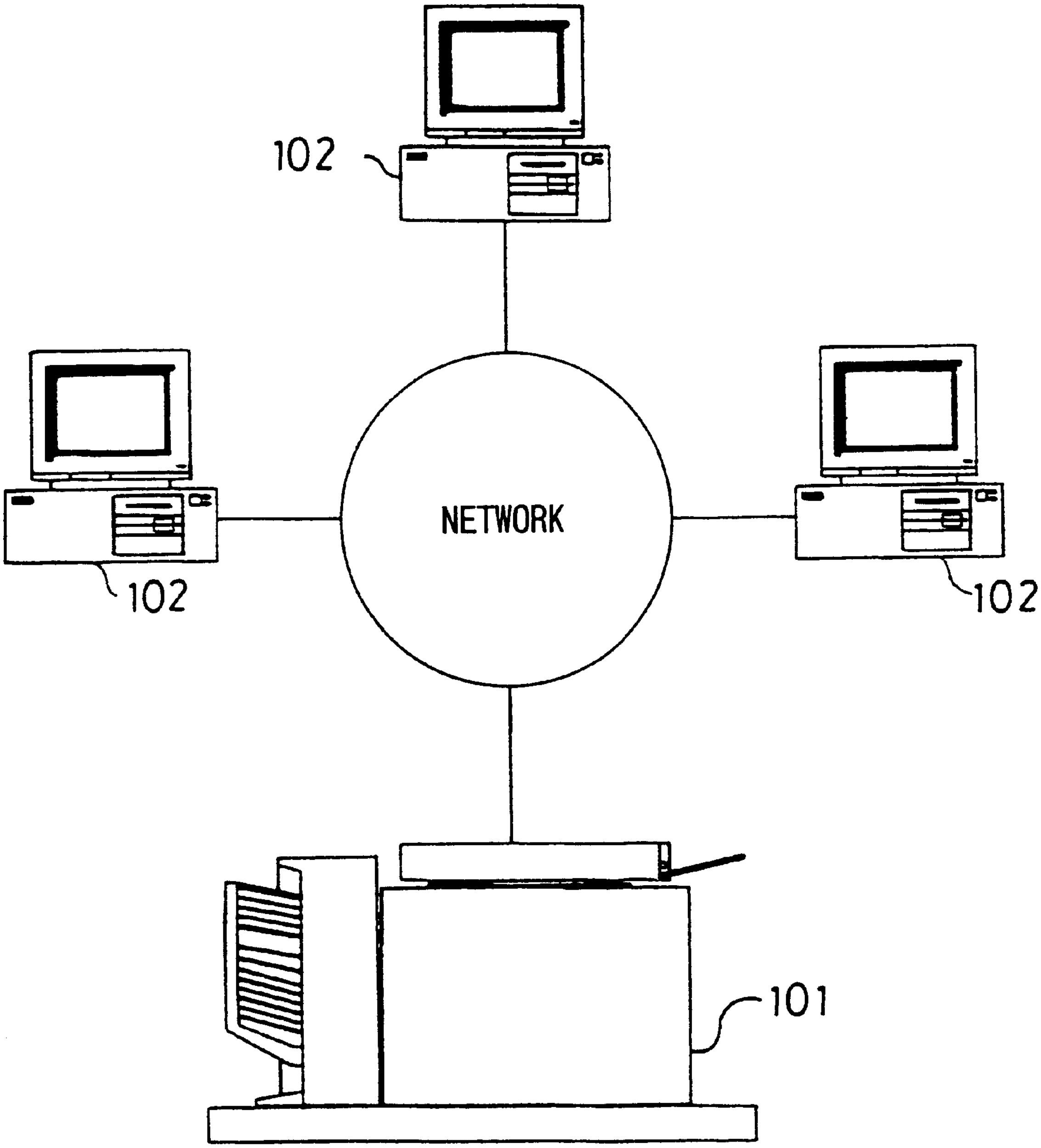
FIG. 1 is a view show a configuration of a printing system including an image forming apparatus of the invention.

Now referring to the drawings, preferred embodiments of the invention are described below.

The following description will describe an embodiment of the invention.

FIG. 1 is a view showing a configuration of a printing system network including an image forming apparatus 101 of the invention. As shown in FIG. 1, an image forming apparatus 101 is linked to a LAN (Local Area Network) so that the image forming apparatus 101 can be shared among a plurality of terminal apparatuses 102 linked therein. In accordance with a print request executed on any terminal apparatus 102 in the network, a print job is transmitted to the image forming apparatus 101 within the network.

Figure 2:
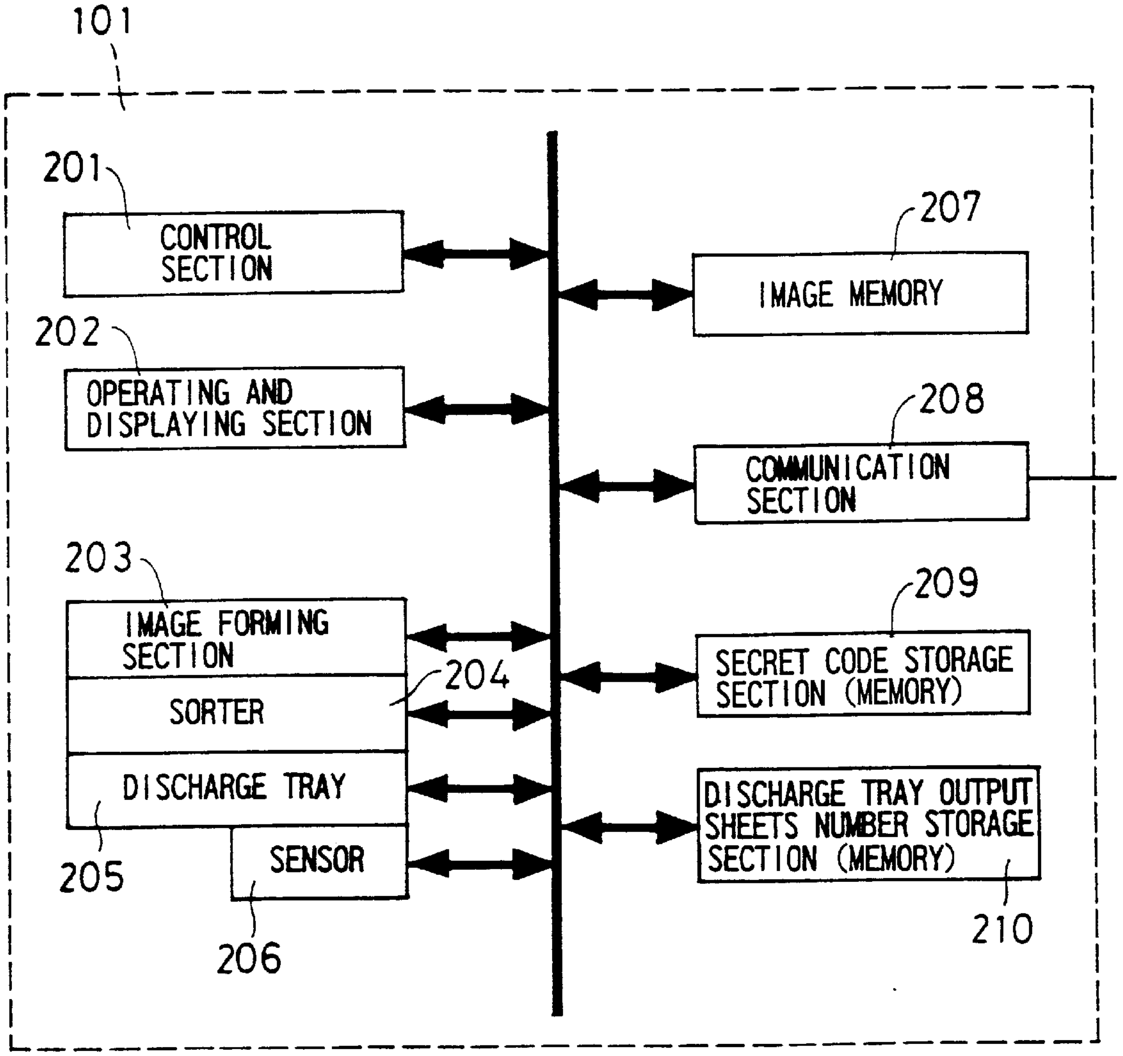
FIG. 2 is an explanatory view showing an internal arrangement of the image forming apparatus of an embodiment of the invention.

FIG. 2 is an explanatory view showing an internal arrangement of the image forming apparatus 101 of an embodiment of the invention. As shown in FIG. 2, the image forming apparatus 101 includes a control section 201 as controlling means, an operating and displaying section 202 as inputting and notifying means, an image forming section 203, a sorter 204 as sorting means, a discharge tray 205, a sensor 206 as detection means, an image memory 207, a communication section 208 as transmission means, a secret code storage section (memory) 209 as secret code storing means, and a discharge tray output sheets number storage section (memory) 210 as discharged sheets number storage means.

The control section 201 controls each of the members 202 through 210 included in the image forming apparatus 101 to perform printing. The control section 201 is furnished with a function to analyze and process a print job received at the communication section 208, print an image on a recording sheet by controlling the image forming section 203, and discharge the printed sheet having the image printed thereon to the discharge tray 205 by controlling the sorter 204.

Further, the control section 201 is capable of storing, after discharging the printed sheets to the discharge tray 205, a print job including print data accompanied by a secret code and information of the target discharge tray to which printed sheets were discharged in the secret code storage section (memory) 209. Thus, upon being entered a secret code on the operating and displaying section 202, the secret code entered is compared with the secret code stored in the secret code storage section (memory) 209 to see if they agree to each other, so that the information of target discharge tray having an identical secrete code will be displayed on the operating and displaying section 202.

The control section 201 is also furnished with a function to store the number of the printed sheets discharged to each discharge tray 205 in the discharge tray output sheet number storage section (memory) 210.

The communication section 208 is a communication interface that allows data input and output processing between the image forming apparatus 101 and terminal apparatuses 102. The communication section 208 is connected to the terminal apparatuses via networking so as to receive a print job including print data and a secret code specific to the print data from the terminal apparatuses 102.

The image memory 207 stores a print job received at the communication section 208 or an image data generated after analyzing and processing of the print job at the control section 201.

The image forming section 203 reads out the image data stored in the image memory 207 and forms images onto recording sheets, and the sorter 204 sorts out and discharges the printed sheets which are the recording sheet having visible images thereon to any of the plurality of discharge trays 205. Each sensor 206 detects whether any printed sheet is present on their respective discharge trays 205, and the outputs from the sensor 206 is transmitted to the control section 201 thereafter.

The operating and displaying section 202 is composed of an operating portion to output a command from the user, and a displaying portion to display operating contents, results of print processing, etc. The operating portion is realized by operation keys, a touch panel or the like, and the displaying portion is realized by a liquid crystal panel, a cathode ray tube (CRT) or the like.

The secret code storage section (memory) 209 stores a secret code set by a user in association with information of a target discharge tray to which printed sheets are discharged according to the user's request.

The discharge tray output sheets number storage section (memory) 210 stores the information associated with the number of the printed sheets present on each discharge tray 205.

Figure 3:
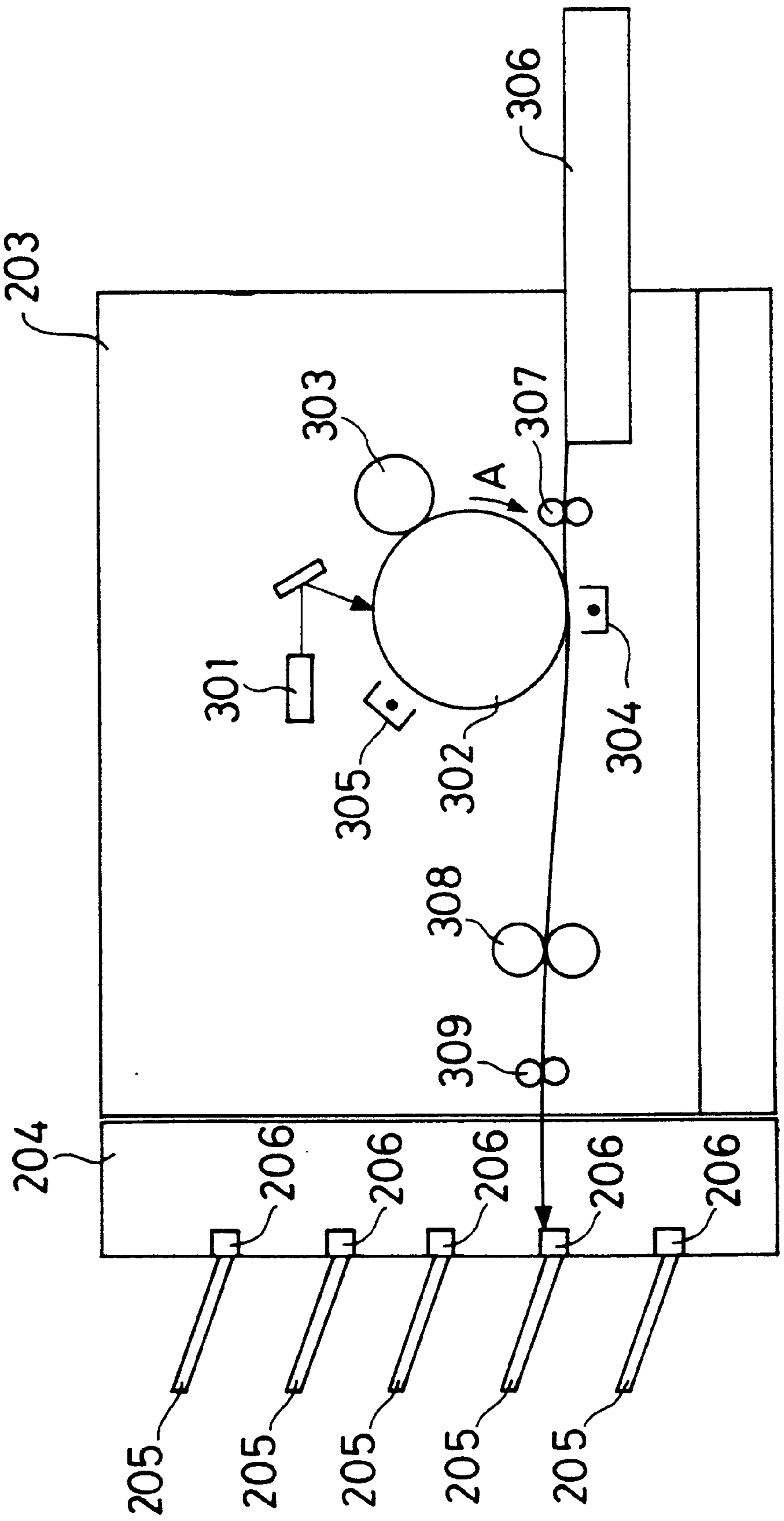
FIG. 3 is a cross sectional view explaining an arrangement of an image forming section, a sorter, discharge trays, and sensors shown in FIG. 2.

FIG. 3 is a cross section explaining an arrangement of an image forming section 203, a sorter 204, discharge trays 205, and sensors 206 shown in FIG. 2. The following description will describe a printing process carried out by the image forming section 203 a motion of the sorter 204 when discharging printed sheets with reference to FIG. 3.

The image data stored in the image memory 207 is read out, and formed into an electrostatic latent image by irradiating a laser beam on the surface of a photosensitive body 302 from a laser scanning unit (hereinafter, abbreviated to LSU) 301 in accordance with the image data.

The photosensitive body 302 is of a drum shape and driven to rotate in a direction indicated by an arrow A. The photosensitive body 302 is surrounded by a developing device 303 for developing the electrostatic latent image on the surface of the laser-beam-exposed photosensitive body 302 into a visible image with toner, a transfer charger 304 for transferring the toner image formed on the photosensitive body 302 onto a recording sheet, a main charger 305 for charging the photosensitive body 302 to a predetermined potential, and the LSU 301 for irradiating a laser beam toward the point of laser beam irradiation on the photosensitive body 302. These components are provided in the order mentioned above, in the rotating direction of the photosensitive body 302 starting from the position of laser beam irradiation.

Recording sheets are held in a feeder tray 306. Pick-up rollers (not shown) for feeding the recording sheets one by one to the image forming portion 203 are provided at the top end portion of the feeder tray 306, and an incoming sheet sensor switch (not shown) for detecting the passing of a recording sheet, PS rollers 307 for aligning the positions of the toner image on the photosensitive body 302 and a recording sheet based on a signal from the incoming sheet sensor switch, the transfer charger 304, fusing rollers 308 for fusing the toner image onto a recording sheet by heat, a discharged sheet detecting switch (not shown) for detecting the passing of a recording sheet before discharge rollers 309, and the discharging rollers 309 are provided in the order, from upstream to downstream about the sheet feeding direction (here, the recording sheet feeding end is denoted as upstream end and the sheet discharging end is denoted as the downstream).

A recording sheet having thereon formed an image is sorted out by the sorter 204 and discharged to one of the discharge trays 205. Each discharge tray 205 is provided with a sensor 206 to detect whether any printed sheet is present on the respective tray 205.

The image forming section 203 of the embodiment adapts the process for a laser beam printer. It should be appreciated, however, that the image forming section 203 is not limited to the laser beam printer, and the image forming section 203 can be any means that forms an image onto a recording sheet, such as an ink jet printer.

Figure 4:
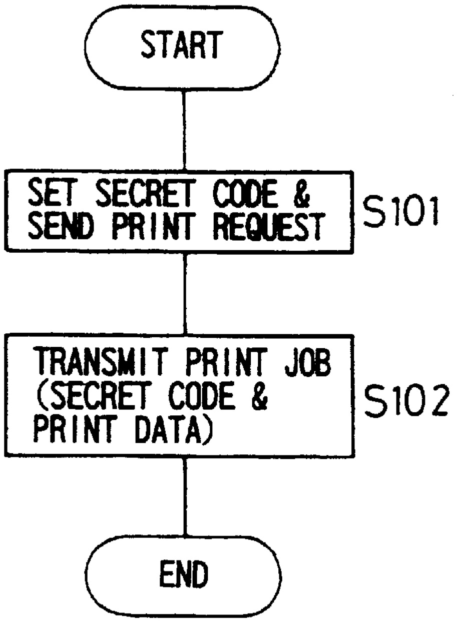
FIG. 4 is a flowchart showing an example of an operation of a terminal apparatus when transmitting print data to the image forming apparatus of the invention.

FIG. 4 is a flowchart showing an example of an operation of a terminal apparatus 102 when transmitting print data to the image forming apparatus 101 of the invention. The following description will describe, with reference to the flowchart of FIG. 4, a procedure according to which the terminal apparatus 102 transmits print data to the image forming apparatus 101.

In order to execute a print request on a terminal apparatuses 102 to send a print job to the image forming apparatus 101, the user first sets to register a secret code that will be used to find a tray on which printed sheets of his request are present (S101).

Having set the secret code, the user transmits a print request, whereupon the terminal apparatus 102 that the user is operating transmits a print job which is print data accompanied with the secret code to the image forming apparatus 101 (S102).

Figure 5:
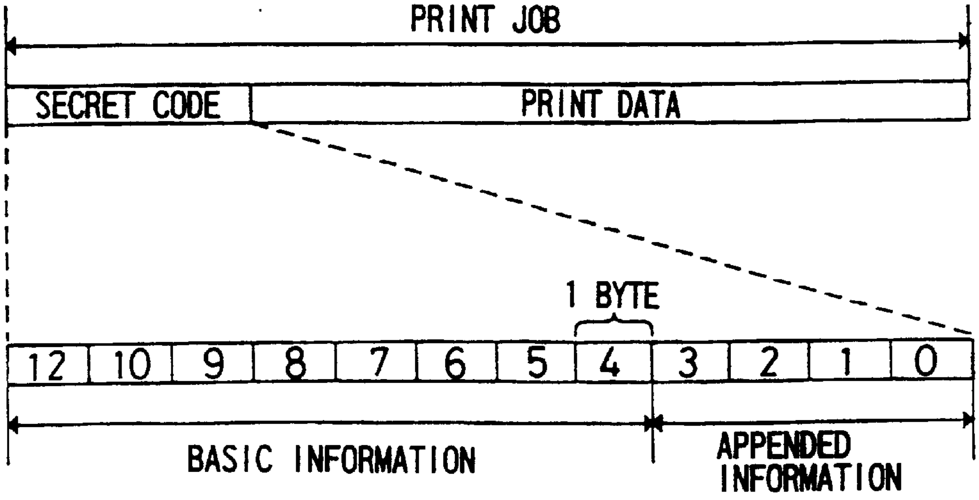
FIG. 5 is an explanatory view showing an example of an arrangement of a secret code transmitted to the image forming apparatus of the invention.

FIG. 5 is an explanatory view showing an example of an arrangement of a secret code transmitted to the image forming apparatus 101 of the invention. A print job is composed of a secret code and print data. As shown in FIG. 5, the secret code is composed of a plurality of bytes. In the embodiment, the secret code is composed of 12 bytes, and the upper 8 bytes form basic information for identifying the terminal apparatus 102 or the user who executed the print request, and the lower 4 bytes form an appended information (date information or the like) for identifying the print job to be easily understood by the user.

Figure 6:
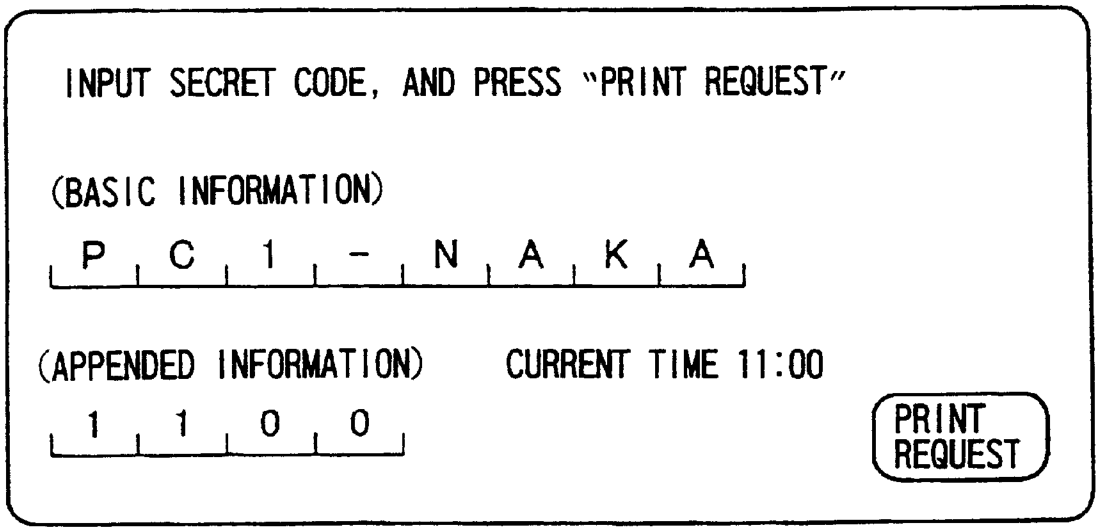
FIG. 6 shows an example of an input screen of the terminal apparatus on which a user allowed to enter a secret code.

FIG. 6 shows an example of an input screen of the terminal apparatus 102, on which a user is allowed to set a secret code. The input screen allows the printer user to input 8-digit basic information and 4-digit appended information as a secret code, and by specifying the print request after the user registered a secret code, the print job containing the secret code is transmitted to the image forming apparatus 101 from the terminal apparatus 102 by means of a LAN.

In the present embodiment, the secret code and print data are combined into a single print job and transmitted from the terminal apparatus 102. However, another method may be used so that the secret code and print data may be transmitted separately.

Figure 7:
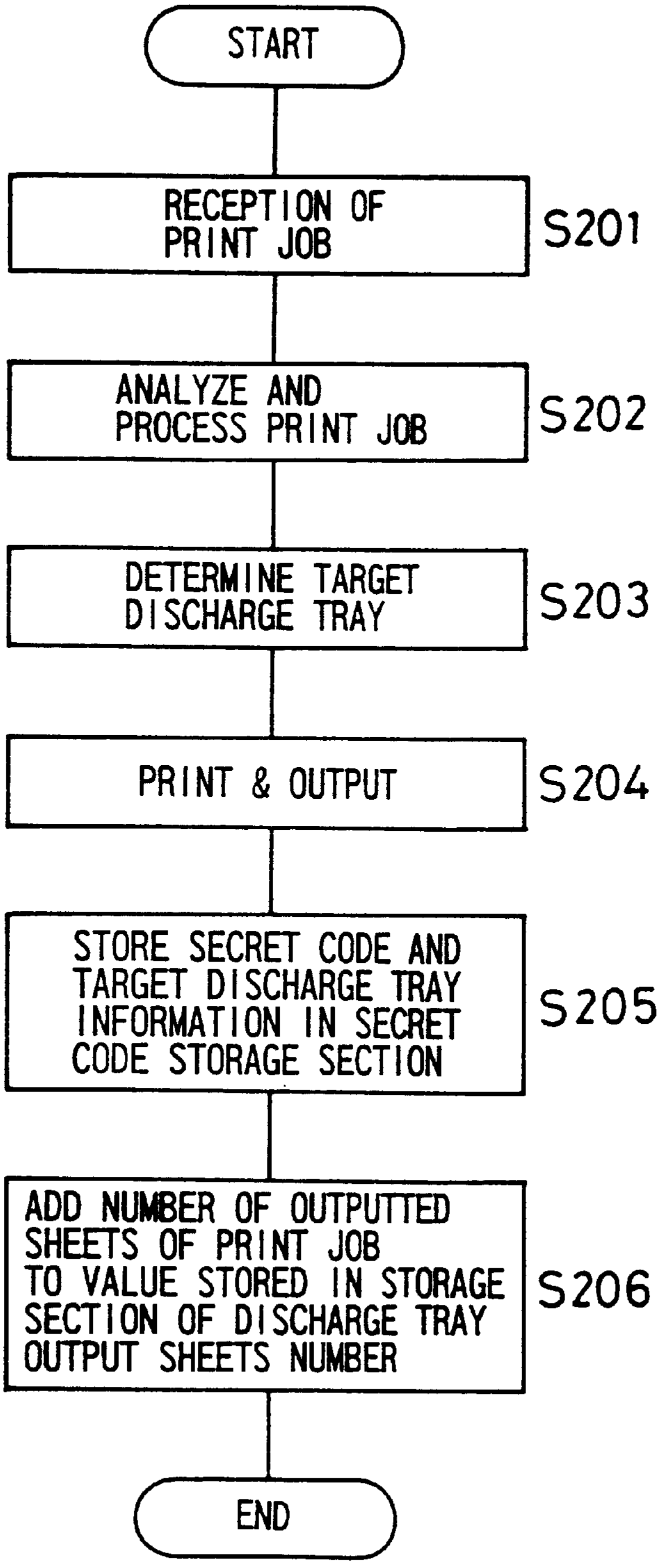
FIG. 7 is a flowchart showing an example of an operation involved in print processing in the image forming apparatus of the invention.

FIG. 7 is a flowchart showing an example of operation involved in print processing in the image forming apparatus 101 of the invention. The following description will describe, with reference to the flowchart of FIG. 7, a procedure to process the print job transmitted from the terminal apparatus 102 and received at the image forming apparatus 101.

Upon receipt of the print job at the communication section 208 (S201), the control section 201 separates the print job into the secret code and print data, and analyzes the print data (document size, the number of prints, etc.) and performs image processing (rasterizing, scaling, etc.), after which the control section 201 stores the image data into the image memory 207 (S202).

Then, the control section 201 detects whether any printed sheet is present on the respective discharge trays 205 by the sensors 206 provided thereto. In response to a detection result received from the sensor 206, an empty discharge tray is selected as a target discharge tray 205, so that printed sheets with the image data are discharged thereto. In cases where the control section 201 fails to find any empty discharge tray, the control section 201 reads out the number of the printed sheets on each of the discharge trays from the discharge tray output sheets number storage section (memory) 210 (S203), and selects a discharge tray 205 holding the printed sheets of the least number of output sheets.

In the embodiment, an extra process is added to the operation proceedings. In cases where the control section 201 fails to find an unused discharge tray 205, before the control section 201 selects a discharge tray on which the least number of printed sheets are present with reference to the readouts from the discharge tray output sheets number storage section (memory) 210 (S203), the control section

201 performs an additional operation, in which the control section 201 reads out the number of the printed sheets in each of the discharge trays, and selects, with reference to the readouts from the secret code storage section (memory) 209, a discharge tray 205 holding printed sheets having the same basic information as that of the print job of the query and at the same time the least number of sheets.

Having determined the discharge tray 205 in this manner, the control section 201 performs printing by controlling the image forming section 203, and discharges the printed sheets to the selected discharge tray 205 by controlling the sorter 204 (S204).

Having completed discharging the printed sheets, the control section 201 stores in the secret code storage section (memory) 209, the secret code of the print job for which printing operation has just completed, data of the target discharge tray and the number of sheets discharged (S205).

In addition, the control section 201 adds the number of sheets about the completed print job to the value stored in the discharge tray output sheets number storage section (memory) 210, with respect to the target discharge tray to which the printed sheets have been discharged (S206).

FIG. 8 is an explanatory view showing an arrangement of a secret code storage section (memory) 209 shown in FIG. 2. FIG. 9 is an explanatory view showing an arrangement of a discharge tray output sheets number storage section (memory) 210 shown in FIG. 2. Here, the following description will describe, with reference to FIGS. 8 and 9, examples of the arrangements of the secret code storage section (memory) 209 and the discharge tray output sheets number storage section (memory) 210.

The secret code storage section (memory) 209 can store the secret code (basic information and appended information) added to the print job, and the target discharge tray to which the printed sheets of the request were discharged, and the number of sheets in association with each other. The row in a bold frame in FIG. 8 shows a state that a print job having a secret code "MASUPC021130" has been transmitted to No. 2 discharge tray 205, in which two sheets are discharged.

When the print job was transmitted, all of the discharge trays 205, No. 1 through No. 5, held printed sheets thereon. As there was no empty discharge tray 205 to discharge printed sheets, the outstanding print job was processed so as to discharge printed sheets to the discharge tray No. 2, to which previously printed sheets having the same basic information "MASUPC02" as that of the outstanding print job have been discharged and on which the least number of sheets were present. Such an arrangement is effective to prevent printed sheets from being confused among users, thereby improving operability and ensuring confidentiality.

Also, because the secret code is made of two portions, the basic information and appended information, the basic information used to identify the same user is identical while the appended information used to identify each print job requested from the same user is different. Therefore, even when one user executes a plurality of print requests, each print job can be identified and controlled separately.

As shown in FIG. 9, the discharge tray output sheets number storage section (memory) 210 can store the discharge tray number to be used to identify each discharge tray 205, as well as the number of printed sheets discharged to each discharge tray 205, in association with each other. For example, in cases where new printed sheets of 7 sheets are discharged to the discharge tray No. 4 under the condition shown in FIG. 9, the value in the right column for the discharge tray No. 4 is updated adding 7 sheets, to 1+7=8.

Figure 10:
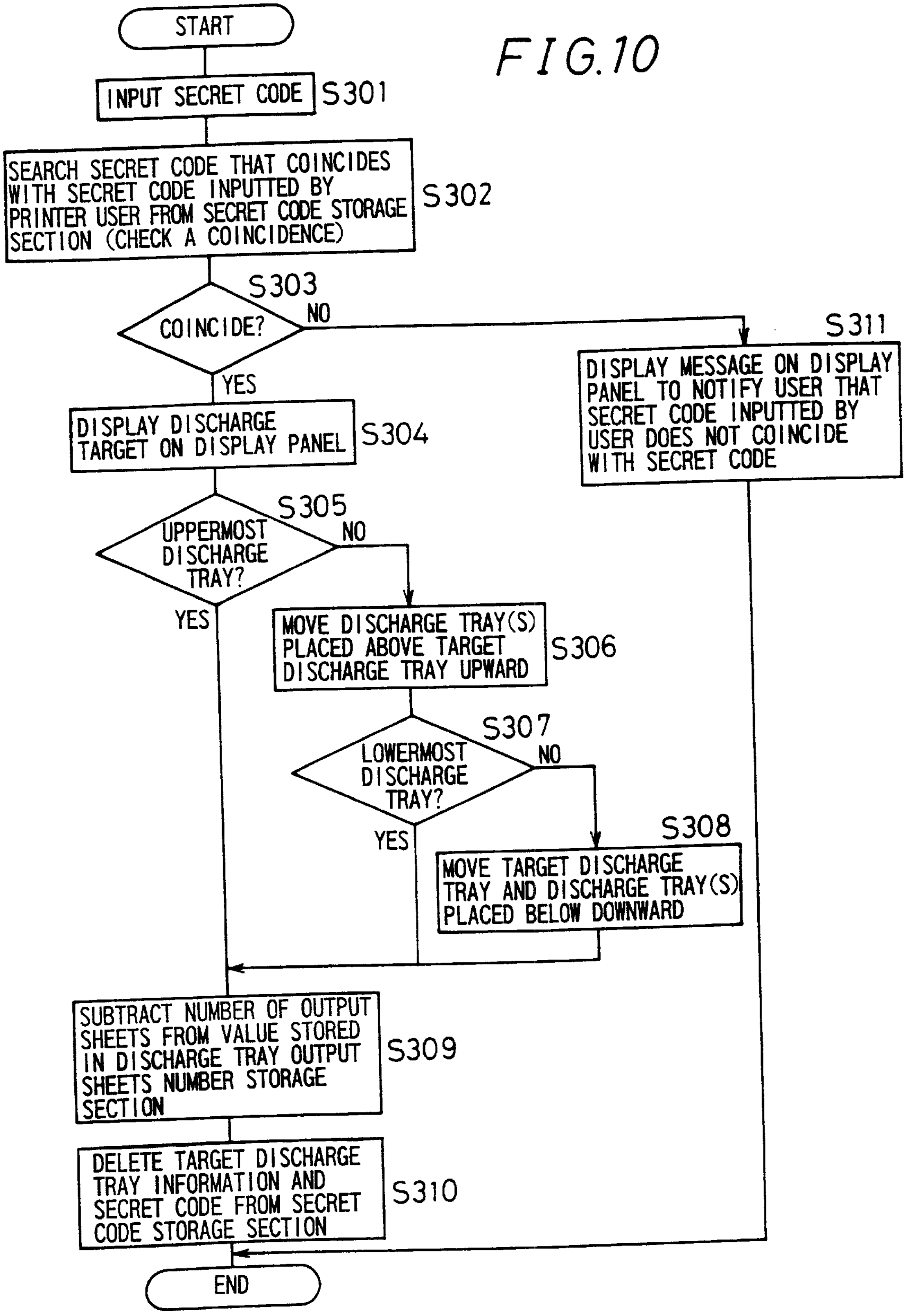
FIG. 10 is a flowchart detailing an example of an operation when the user picks up the printed sheets of his request in the image forming apparatus of the invention.

FIG. 10 is a flowchart showing an example of an operation when the user picks up the printed sheets of his request on the image forming apparatus 101 of the invention. The following description will describe, with reference to the flowchart of FIG. 10, a procedure according to which the user picks up the printed sheets.

In cases where the user picks up printed sheets on the image forming apparatus 101, the user first enter the secret code that had been registered on the terminal apparatus 102 at the time of making a print request using the operating and displaying section 202 (S301).

In the embodiment, the secret code is entered on the operating panel that is used as the operating portion. It should be appreciated, however, that the input means is not limited to the operating panel, and a card reader may be used as means to enter the secret code.

After the user enters the secret code, the control section 201 compares the secret code stored in the secret code storage section (memory) 209 at the time of print request with the one entered by the user using the operating and displaying section 202, in order to see if they coincide with each other (S302)

In cases where the control section 201 determines that the secret code entered by the user is not identical with any of the secret codes stored in the secret code storage section (memory) 209 as a result of the coincidence checking (S303), the control section 201 displays on the display panel of the operating and displaying section 202 of the image forming apparatus 101 a message that there is no secret code coincidence (S311).

In cases where the entered secret code determines that there is no coincidence with any of the stored secret codes (S303), the control section 201 reads out the target discharge tray information corresponding to the secret code stored in the secret code storage section (memory) 209, and displays the target discharge tray information on the operating and displaying section 202 (S304).

In the embodiment, the display panel is used as notifying means. It should be appreciated, however, that the notifying means is not limited to the display panel but also is realized by a structure being provided with a lamp, such as an LED, to each discharge tray 205. In this case, the target discharge tray 205 can be notified by a flash or illumination of the lamp.

Further, in cases where the entered secret code coincides with any of the stored secret codes, the control section 201 displays the target discharge tray information on the operating and displaying section 202, and meanwhile the control section 201 drives motors (not shown) provided to the respective discharge trays and moves the discharge trays upward or downward, thereby creating a sufficient space between the top surface of the discharge tray holding the printed sheets the user is to pick up and the bottom surface of the discharge tray located above the target discharge tray (S305 through S308). In cases where the discharge tray 205 supplied with the printed sheets is the uppermost discharge tray, the control section 201 does not move any discharge tray 205; otherwise, the control section 201 moves the discharge tray(s) 205 located above the discharge tray 205 supplied with the printed sheets upward (S306). Further, in cases where the discharge tray supplied with the printed sheets is not the lowermost discharge tray, the control section 201 moves the discharge tray 205 supplied with the printed sheets and the discharge tray(s) 205 located below downward (S308).

Having displayed the target discharge tray information, the control section 201 subtracts the number of sheets removed from the value stored in the discharge tray output sheets number storage section (memory) 210, which value representing the number of sheets on the discharge tray 205 displayed (S309). The number of sheets removed is determined by referring to the readouts from the secret code storage section (memory) 209.

Also, having updated the value in the discharge tray output sheets number storage section (memory) 210, the control section 201 deletes the secret code corresponding to the print job of the removed printed sheets, data of the target discharge tray, and the number of discharged printed sheets, from the secret code storage section (memory) 209 (S310).

By deleting the obsolete information from the secret code storage section (memory) 209 as mentioned above, it is possible to save a memory capacity of the image forming apparatus 101. Further, unless the obsolete information is deleted at an appropriate time, a coincidence checking must go through all of the remaining information thereafter including obsolete ones, which will result in a time consuming operation. However, by appropriately deleting the obsolete information from the memory, a coincidence is checked only among valid information, thereby minimizing the coincidence checking time.

In consideration of a case where the user who registered the secret code at the time of print request picks up the printed sheets from the discharge tray without entering the secret code, it is arranged such that, when the sensor 206 detects that the discharge tray becomes empty, the control section 201 deletes the secret code and target discharge tray information corresponding to the empty discharge tray 205 from the secret code storage section (memory) 209, and updates the value stored in the discharge tray output sheets number storage section (memory) 210 to zero, so that the value represent the number of sheets on the discharge tray being emptied.

In this manner, even when the user picks up the printed sheets in an irregular manner without entering the secret code, it is possible to erase obsolete information from the secret code storage section (memory) 209, thereby improving the memory utilization in the image forming apparatus 101, and it is also possible to correct the value representing the number of sheets stored in the discharge tray output sheets number storage section (memory) 210 to a correct value.

Figure 11A:
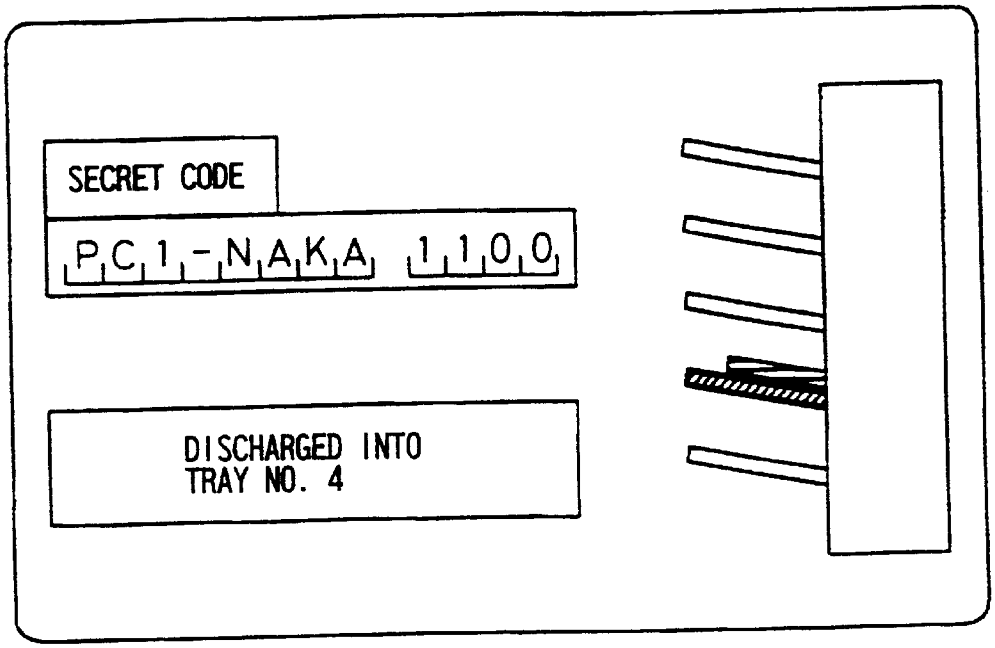
FIGS. 11A and 11B are explanatory views showing a display panel provided to an operating and displaying section shown in FIG. 2.
Figure 11B:
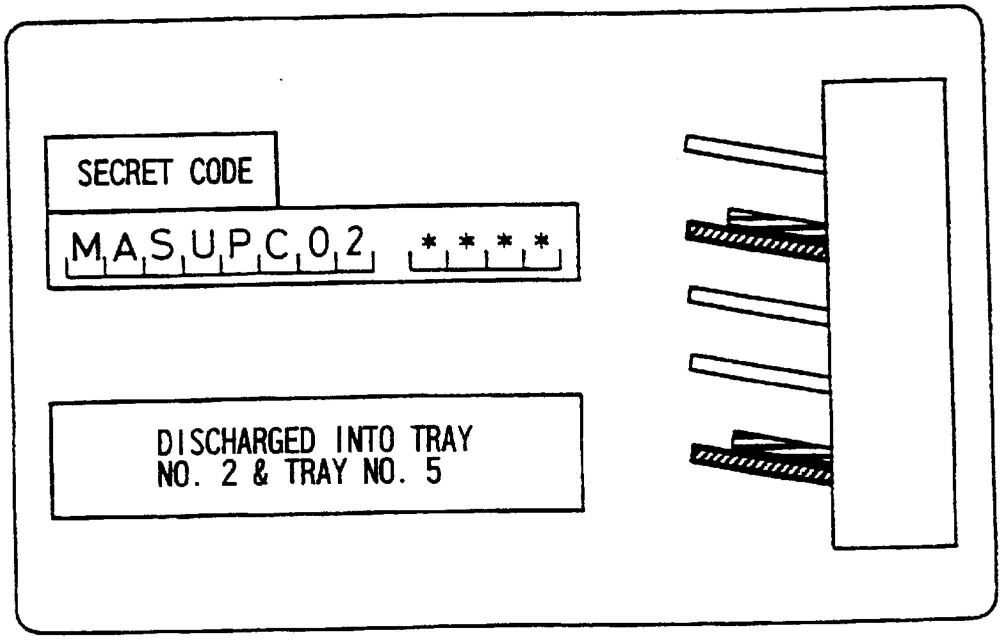

FIGS. 11A and 11B are explanatory views showing a display panel provided to an operating and displaying section 202 shown in FIG. 2. As shown in FIGS. 11A and 11B, the user can visually recognize to which discharge tray the printed sheets he is to pick up were discharged. In FIG. 11A, the user can know the location of the target printed sheets of his request on the display, by entering particular values into both of the basic information and appended information. In FIG. 11B, the user can know the target discharge tray information for all of the printed sheets having the common basic information at one time by inputting a particular value into the basic information and a value that stands for any characters into the appended information (in this example, an asterisk, "*").

In these examples, the secret code is displayed on the display panel, but it may be arranged not to display the secret code to increase confidentiality.

Figure 12A:
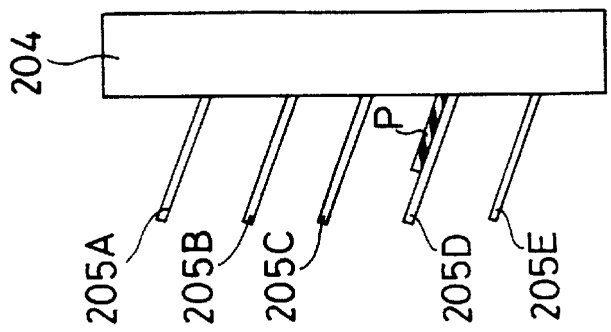
FIGS. 12A through 12D are explanatory views showing movements of the discharge trays when the user picks up the printed sheets of his request in the image forming apparatus of the invention.
Figure 12B:
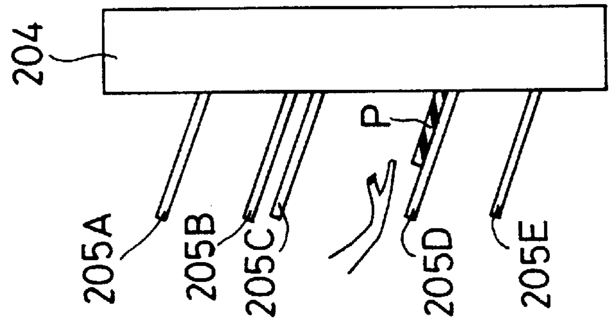
Figure 12C:
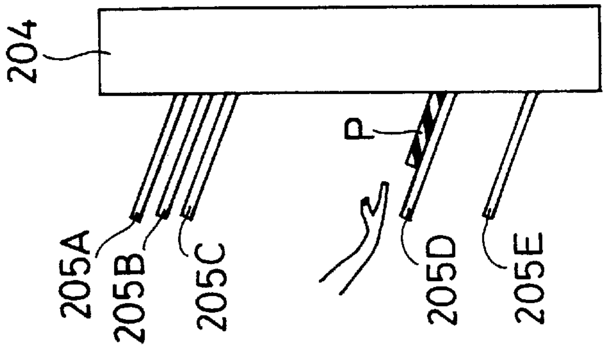
Figure 12D:
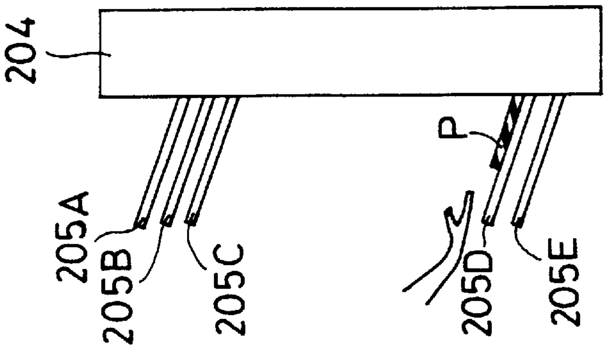

FIGS. 12A through 12D are explanatory views showing movements of the discharge trays 205 when the user picks up the printed sheets of his request in the image forming apparatus 101 of the invention. The following description will describe, with reference to FIGS. 12A through 12D, a concrete example of how a larger space is created between the discharge trays when the printed sheets are picked up as described in steps S305 through S308. Generally, as shown in FIG. 12A, the discharge trays 205A through 205E are placed at regular intervals. When a secret code is entered under the above condition, and printed sheets P are discharged to the discharge tray 205D which is not the uppermost discharge tray as shown in FIG. 12B, the discharge tray 205C located directly above the discharge tray 205D is driven by a motor provided thereto, in order to move upward, whereby a space between the discharge trays 205C and 205D is enlarged. In addition, in cases where the image forming apparatus 101 is provided with a number of discharge trays, and moving only one discharge tray placed above the discharge tray holding the printed sheets P cannot create a sufficient space, as shown in FIG. 12C, all the discharge trays 205A through 205C located above the discharge tray 205D holding the printed sheets P are moved upward. Further, as shown in FIG. 12D, the discharge tray 205D holding the printed sheets P and the discharge tray 205E placed below the discharge tray 205D are moved downward. Consequently, a space between the discharge trays is enlarged sufficiently. This procedure, together with the target discharge tray information displayed on the display panel, enables the user to readily recognize the discharge tray holding the printed sheets, making it easier for the user to pick up the printed sheets from the target discharge tray.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image forming apparatus connected to a plurality of terminal apparatuses via a network, comprising:

receiving means for receiving print data and a secret code specific to the print data as a print job from any of the terminal apparatuses via the network;

sorter means having a plurality of discharge trays to which print sheet(s) corresponding to the print job received by the receiving means is/are discharged;

controlling means for processing the print job received by the receiving means to sort out the printed sheet(s) corresponding to the print job and discharge the printed sheet(s) corresponding to the print job onto a particular discharge tray of the sorter means;

secret code storing means for storing information of the particular discharge tray to which the printed sheet(s) corresponding to the print job was discharged, as target discharge tray information in connection with the secret code specific to the print data;

input means for enabling inputting of the secret code at a point in time after the print job including the secret code has been received; and notifying means for comparing the secret code inputted by the input means with the secret code from the print job that is stored in the secret code storing means, and when a match therebetween is found then notifying a user of the specific target discharge tray at which the print sheet(s) corresponding to the print job is/are located.

2. The image forming apparatus of claim 1, wherein the secret code comprises basic information for identifying one of the terminal apparatuses and the user who has requested printing, and appended information.

3. The image forming apparatus of claim 1, wherein, upon notification of the specific target discharge tray by the notifying means, the sorter means is controlled so that a space between the target discharge tray and a discharge tray placed directly above is enlarged.

4. The image forming apparatus of claim 1, further comprising:

detection means for detecting whether a printed sheet is present on the respective discharge trays or not; and output sheets number storing means for storing a number of printed sheets discharged to each of the discharge trays, wherein the sorter means selects a discharge tray to which no printed sheet is present, in response to an output from the detection means, and in the case where a printed sheet is present on all of the discharge trays, in response to an output of the output sheets number storing means, the sorter means selects a discharge tray on which a least number of printed sheets are present, from among the discharge trays.

5. The image forming apparatus of claim 1, further comprising:

detection means for detecting whether or not a printed sheet(s) is present on one or more of the respective discharge trays, wherein, in cases where the detection means detects that printed sheet(s) present on one of the discharge trays are completely removed therefrom, the secret code storing means deletes information corresponding to the discharge tray from which the printed sheet(s) have been removed, and output sheets number storing means updates a value stored therein to zero, which value represents that the discharge tray is empty.

* * * * *